US011314603B2

(12) United States Patent
Ciocari et al.

(10) Patent No.: US 11,314,603 B2
(45) Date of Patent: Apr. 26, 2022

(54) RECOVERY IMAGE DOWNLOADS VIA DATA CHUNKS

(71) Applicant: Hewlett-Packard Development Company, L.P., Spring, TX (US)

(72) Inventors: Juliano Francisco Cagnini Ciocari, Porto Alegre (BR); Ronaldo Rodrigues Ferreira, Porto Alegre (BR); Edson Schardosim Behnck, Porto Alegre (BR)

(73) Assignee: Hewlett-Packard Development Company, L.P., Spring, TX (US)

( * ) Notice: Subject to any disclaimer, the term of this patent is extended or adjusted under 35 U.S.C. 154(b) by 0 days.

(21) Appl. No.: 17/052,332

(22) PCT Filed: Nov. 5, 2018

(86) PCT No.: PCT/US2018/059161
§ 371 (c)(1),
(2) Date: Nov. 2, 2020

(87) PCT Pub. No.: WO2020/096561
PCT Pub. Date: May 14, 2020

(65) Prior Publication Data
US 2021/0357295 A1    Nov. 18, 2021

(51) Int. Cl.
G06F 12/00 (2006.01)
G06F 11/14 (2006.01)
G06F 3/06 (2006.01)

(52) U.S. Cl.
CPC ........ *G06F 11/1464* (2013.01); *G06F 3/0604* (2013.01); *G06F 3/0608* (2013.01);
(Continued)

(58) Field of Classification Search
CPC .. G06F 11/1464; G06F 3/0604; G06F 3/0608; G06F 3/0644; G06F 3/0646;
(Continued)

(56) References Cited

U.S. PATENT DOCUMENTS 6,615,365 B1    9/2003  Jenevein et al.
7,216,251 B2    5/2007  Gaunt et al.
(Continued)

OTHER PUBLICATIONS

Anonymous: "Chunked transfer encoding—Wikipedia", Dec. 2, 2013 (Dec. 2, 2013), XP055500808, Retrieved from the Internet: URL: https://en.wikipedia.org/w/index.php?title=Chunked_transfer_encoding&oldid=584191363 [retrieved on Aug. 20, 2018].
(Continued)

*Primary Examiner* — John A Lane
(74) *Attorney, Agent, or Firm* — HPI Patent Department

(57) ABSTRACT

An example non-transitory computer-readable storage medium comprising instructions that when executed cause a processor of a computing device to: in response to receiving a chunk size request from a recovery agent executable at an operating system of the computing device, determine a chunk size via firmware instructions of the computing device; transmit the chunk size from the firmware instructions to the recovery agent; receive data chunks of a recovery image from the recovery agent in sequence; store the data chunks in a storage device of the computing device; and construct the recovery image using the data chunks.

15 Claims, 7 Drawing Sheets

(52) U.S. Cl.
CPC .......... *G06F 3/0644* (2013.01); *G06F 3/0646* (2013.01); *G06F 3/0688* (2013.01); *G06F 11/1451* (2013.01); *G06F 11/1469* (2013.01)

(58) Field of Classification Search
CPC ............... G06F 3/0688; G06F 11/1451; G06F 11/1469; G06F 11/1433; G06F 11/1402; G06F 11/1446; G06F 11/1448; G06F 11/1458
See application file for complete search history.

(56) References Cited

U.S. PATENT DOCUMENTS

| | | | |
|---|---|---|---|
| 7,565,517 | B1 | 7/2009 | Arbon |
| 8,762,769 | B2 | 6/2014 | Ledoux et al. |
| 8,924,952 | B1 | 12/2014 | Hou |
| 9,063,822 | B2 | 6/2015 | Valiyaparambil et al. |
| 9,268,651 | B1 * | 2/2016 | Salyers .................... G06F 12/08 |
| 9,575,978 | B2 * | 2/2017 | Tevis ...................... G06F 16/13 |
| 9,940,059 | B2 * | 4/2018 | Agrawal .............. G06F 16/2365 |
| 10,776,218 | B2 * | 9/2020 | Danilov .............. G06F 11/1464 |
| 2008/0120459 | A1 | 5/2008 | Kaneda et al. |
| 2013/0061089 | A1 * | 3/2013 | Valiyaparambil ....... G06F 8/658 714/15 |
| 2013/0167140 | A1 | 6/2013 | Androncik et al. |
| 2013/0185548 | A1 | 7/2013 | Djabarov et al. |
| 2014/0365824 | A1 | 12/2014 | Huang et al. |
| 2017/0255515 | A1 | 9/2017 | Kim et al. |
| 2018/0124544 | A1 | 5/2018 | Gupta et al. |

OTHER PUBLICATIONS

Wikipedia: "Transmission Control Protocol—Wikipedia", Sep. 17, 2014 (Sep. 17, 2014), XP055343717, Retrieved from the Internet: URL: https://en.wikipedia.org/w/index.php? title= Transmission_ Control_Protocol&oldid=626010337 [retrieved on Dec. 2, 2021].
Partitions and Images, May 15, 2018, Android Open Source Project, 6 pgs, https://source.android.com/devices/bootloader/partitions-images.

* cited by examiner

RECOVERY IMAGE DOWNLOADS VIA DATA CHUNKS

BACKGROUND

An operating system of a computing device may control many aspects of computing device. When the operating system is corrupted or damaged, the operations of the computing device may be severely limited or the computing device may be rendered inoperable.

BRIEF DESCRIPTION OF THE DRAWINGS

Some examples of the present application are described with respect to the following figures.

DETAILED DESCRIPTION

Figure 1:
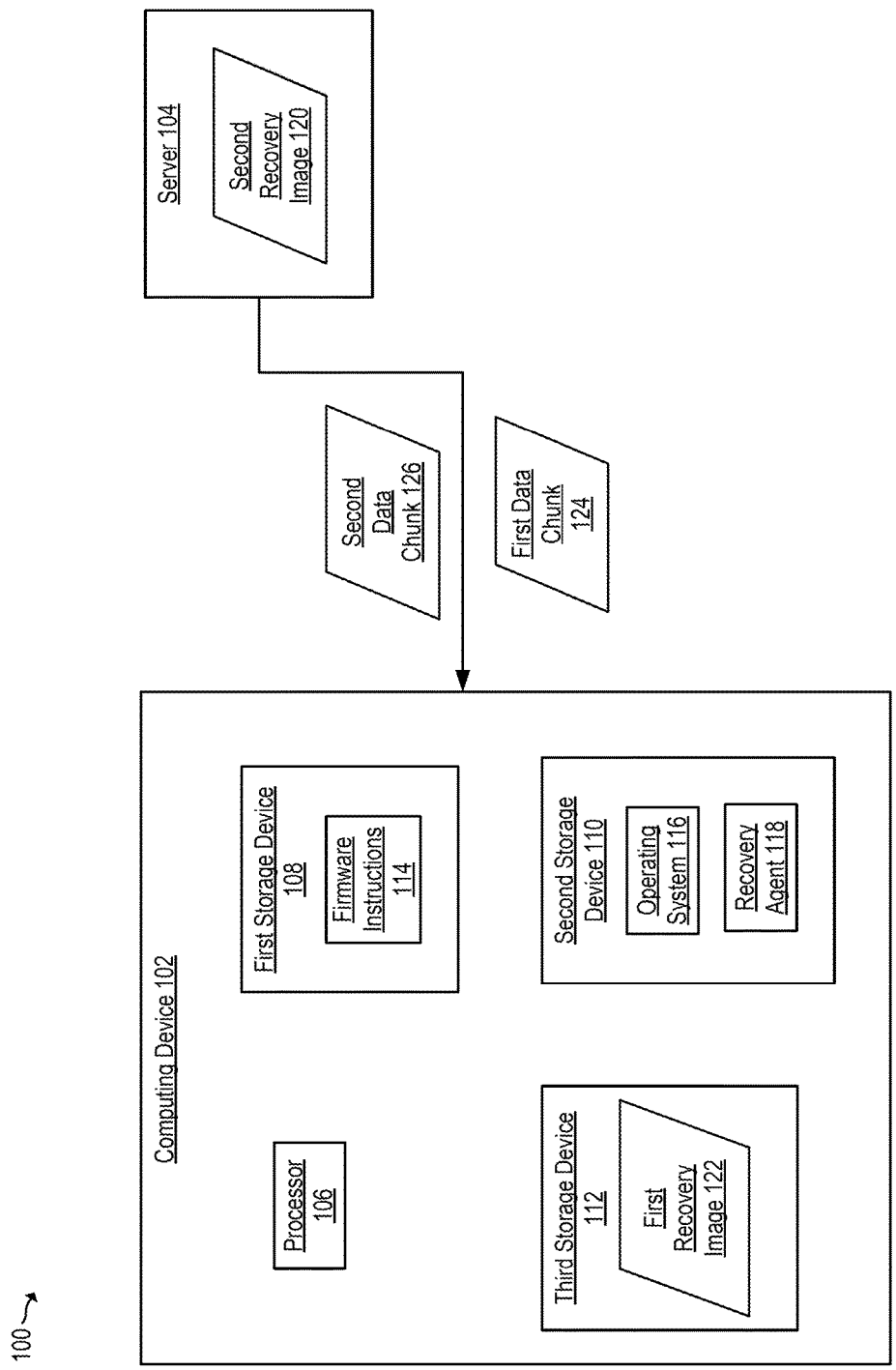
FIG. 1 illustrates a system to transmit a recovery image via data chunks from a server to a computing device, according to an example.

When an operating system of a computing device is corrupted or damaged, the operating system may be repaired via a recovery operation. The computing device may store a recovery image in a reserved partition of a storage device of the computing device. The computing device may replace the corrupted or damaged operating system using the recovery image. However, the stored recovery image may become outdated once the computing device updates the operating system (e.g., by installing security patches). This may create security issues and user friction, because the operating system will be restored without the latest security patches, and also, the user may have to spend a lot of time installing the security patches. Further, the reserved partition may reduce the disk space available to be used by the computing device.

Examples described herein provide an approach to download a recovery image via data chunks. For example, a non-transitory computer-readable storage medium may comprise instructions that when executed cause a processor of a computing device to: in response to receiving a chunk size request from a recovery agent executable at an operating system of the computing device, determine a chunk size via firmware instructions of the computing device; transmit the chunk size from the firmware instructions to the recovery agent; receive data chunks of a recovery image from the recovery agent in sequence; store the data chunks in a storage device of the computing device; and construct the recovery image using the data chunks.

In another example, a non-transitory computer-readable storage medium may comprise instructions that when executed cause a processor of a computing device to: request, via a recovery agent executable at an operating system of the computing device, a chunk size from firmware instructions of the computing device; in response to receiving the chunk size, download, via the recovery agent, a first data chunk of the recovery image from a server, wherein a size of the first data chunk corresponds to the chunk size; receive the first data chunk from the server; transmit the first data trunk from the recovery agent to the firmware instructions; and in response to receiving an acknowledgement from the firmware instructions associated with the first data chunk, download, via the recovery agent, a second data chunk of the recovery image from the server.

In another example, a computing device may comprise a first storage device, firmware instructions stored in the first storage device, a second storage device, a recovery agent and an operating system (OS), a third storage device, and a processor. The recovery agent and the OS may be stored in the second storage device. The processor may determine, via the firmware instructions, a chunk size of a recovery image. The processor may also download, via the recovery agent, a first data chunk of the recovery image from a server. A size of the first data chunk may correspond to the chunk size. The processor may further, in response to a determination that the first data chunk is valid, download, via the recovery agent, a second data chunk of the recovery image from the server. A size of the second data chunk may correspond to the chunk size. The processor may further store, via the firmware instructions, the first data chunk and the second data chunk in the third storage device. The processor may further construct, via the firmware instructions, the recovery image using the first chunk and the second chunk. Examples described herein may increase the flexibility and/or convenience associated with repairing an operating system.

FIG. 1 illustrates a system 100 to transmit a recovery image via data chunks from a server to a computing device, according to an example. System 100 may include a computing device 102 and a server 104.

Computing device 102 may be, for example, a notebook computer, a desktop computer, an all-in-one system, a tablet computing device, a mobile phone, an electronic book reader, or any other electronic device suitable to download a recovery image via data chunks. In some examples, server 104 may be similar to computing device 102. In some examples, server 104 may be a web-based server, a local area network server, a cloud-based server, or any other electronic device suitable to transmit a recovery image via data chunks.

Computing device 102 may include a processor 106, a first storage device 108, a second storage device 110, and a third storage device 112. First storage device 108, second storage device 110, and third storage device 112 may each be a distinct device. Computing device 102 may also include firmware instructions 114 that are stored in first storage device 108. Computing device 102 may further include an operating system (OS) 116 and recovery agent 118. OS 116 and recovery agent 118 may be stored in second storage device 110.

As used herein, first storage device 108, second storage device 110, and third storage device 112 may be non-volatile memory. Non-volatile memory may retain stored data even after having been power cycled. In some examples, first storage device 108 may be implemented using an Electrically Erasable Programmable Read-Only Memory (EEPROM) device (e.g., an EEPROM chip). Second storage device 110 may be implemented using a solid-state drive (SSD) or a hard disk drive (HDD). Third storage device 112 may be implemented using an embedded Multi-Media Card (eMMC) device.

As used herein, firmware instructions 114 may be a series of instructions that are executable by processor 106. Firmware instructions 114 may be stored in non-volatile memory, such as first storage device 108. Firmware instructions 114 may be the Basic Input/Output System (BIOS) of computing device 102 that initializes hardware of computing device 102 and loads OS 116 when computing device 102 is botting up. Firmware instructions 114 may be implemented based on the Unified Extensible Firmware Interface (UEFI) specification.

As used herein, OS 116 may a series of instructions that are executable by processor 106. OS 116 may manage both hardware and software resources of computing device 102 when OS 116 is executing. In some examples, OS 116 may be implemented as a 32-bit operating system. In some examples, OS 116 may be implemented as a 64-bit operating system. In some examples, OS 116 may be implemented as a Windows operating system. In some examples, OS 116 may be implemented as a Linux operating system.

As used herein, recovery agent 118 may be a series of instructions that are executable by processor 106. Recovery agent 118 may be implemented as a background process (e.g., a Windows service, a daemon, etc.) that executes within OS 116.

During operation, recovery agent 118 may automatically (i.e., without any user input) execute periodically (e.g., every hour, every day, etc.). During execution, recovery agent 118 may determine if a recovery image update condition has been satisfied. In some examples, recovery agent 118 may communicate with server 104 to determine a date of a second recovery image 120 stored in server 104. Recovery agent 118 may compare the date of second recovery image 120 to a date of a first recovery image 122 stored in third storage device 112. As used herein, a recovery image (first recovery image 122 and second recovery image 120) may be a file containing the contents and structure of OS 116.

Recovery agent 118 may determine if the recovery image update condition has been satisfied based on the comparison. If the date of first recovery image 122 is older than the data of second recovery image 120, recovery agent 118 may determine that the recovery image update condition has been satisfied. Thus, recovery agent 118 may determine that second recovery image 120 is to be downloaded to replace first recovery image 122. In some examples, instead of a date, other aspects, such as respective version number, age, etc. of recovery images 120 and 122 may be used to perform the comparison.

In some examples, recovery agent 118 may download a recovery image from server 104 every time recovery agent 118 is executed without performing the comparison. In some example, recovery agent 118 may download a recovery image from server 104 if recovery agent 118 detects that no recovery image is stored in third storage device 112.

In response to a determination to download second recovery image 120 from server 104, recovery agent 118 may receive a chunk size from firmware instructions 114 to be used to download second recovery image 120. Recovery agent 118 may download second recovery image 120 in data chunks where the size of each data chunk is based on the chunk size. For example, the chunk size may be 1024 bytes. When the chunk size is determined, recovery agent 118 may begin to download second recovery image 120 by requesting data chunks of second recovery image 120 from server 104.

In response to receiving the request, server 104 may transmit the data chunks in sequence. For example, server 104 may transmit a first data chunk 124 to recovery agent 118. In response to receiving first data chunk 124, recovery agent 118 may transmit first data chunk 124 to firmware instructions 114. Firmware instructions 114 may validate first data chunk 124. In some examples, firmware instructions 114 may validate first data chunk 124 using hash values.

In response to a determination that first data chunk 124 is valid, firmware instructions 114 may acknowledge to recovery agent 118 that firmware instructions 114 has accepted first data chunk 124. Also, firmware instructions 114 may store first data chunk 124 in third storage device 112. In some examples, third storage device 112 may only be accessible by firmware instructions 114. OS 116 may not be able to access third storage device 112. Thus, data stored in third storage device 112 (e.g., first data chunk 124) may be less likely to be comprised if OS 116 is comprised. In response to receiving an acknowledgement associated with first data chunk 124 from firmware instructions 114, recovery agent 118 may begin to download a second data chunk 126 of second recovery image 120 from server 104. In response to a determination that first data chunk 124 is invalid, firmware instructions 114 may reject first data chunk 124. Recovery agent 118 may download first data chunk 124 again when firmware instructions 114 reject first data chunk 124.

During a recovery operation to repair or replace OS 116, firmware instructions 114 may delete first recovery image 122 and construct second recovery image 120 in third storage device 112 using all the data chunks of second recovery image 120 (e.g., first data chunk 124 and second data chunk 126). When second recovery image 120 is constructed, firmware instructions 114 may discard all the data chunks of second recovery image 120. In some examples, before firmware instructions 114 are to construct second recovery image 120, firmware instructions 114 may validate all the data chunks again. When all the data chunks are validated, firmware instructions 114 may construct second recovery image 120 and use second recovery image 120 to repair and/or replace OS 116.

By downloading second recovery image 120 in data chunks and storing the data chunks in third storage device 112 directly, a reserved partition in second storage device 110 for recovery image storage may be avoided. Thus, more storage space in second storage device 110 may be available for use by a user of computing device 102. Further, a reboot of computing device 102 may be avoided during the recovery operation as second recovery image 120 is not copied from second storage device 110 to third storage device 112.

Figure 2:
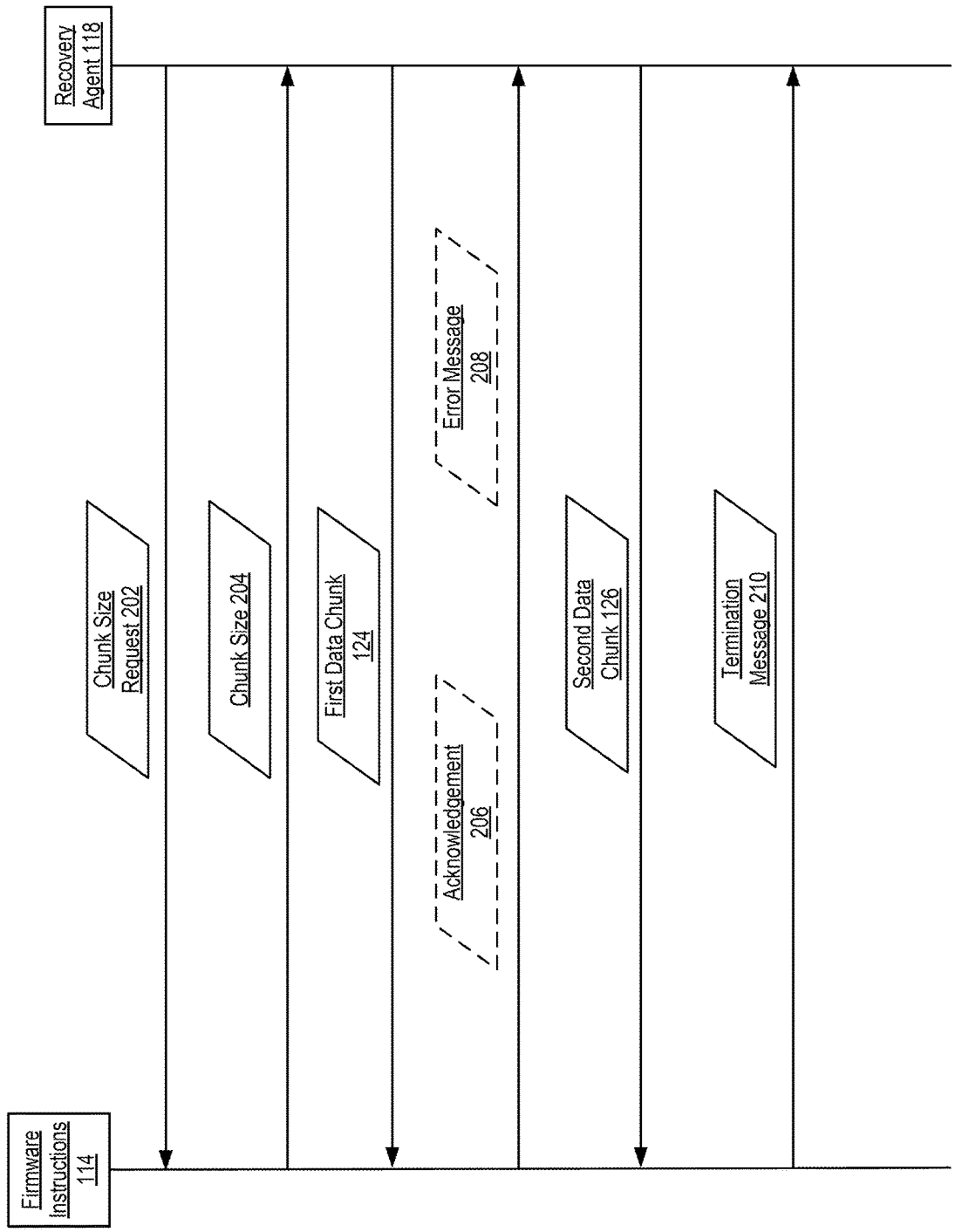
FIG. 2 illustrates message and data exchanges between a recovery agent of the system of FIG. 1 and firmware instructions of the system of FIG. 1 during a recovery image download operation, according to an example.

FIG. 2 illustrates message and data exchanges between recovery agent 118 of computing device 102 of FIG. 1 and firmware instructions 114 of computing device 102 during a recovery image download operation, according to an example.

In response to a determination that recovery agent 118 is to download a recovery image, such as second recovery image 120, from server 104, recovery agent 118 may transmit a chunk size request 202 to firmware instructions 114. In response to receiving chunk size request 202, firmware instructions 114 may determine a chunk size 204. In some examples, chunk size 204 may be fixed and stored in computing device 102 (e.g., in first storage device 108).

Firmware instructions 114 may retrieve chunk size 204 and transmit chunk size 204 to recovery agent 118.

In some examples, firmware instructions 114 may determine chunk size 204 dynamically based on chunk size request 202. That is, firmware instructions 114 may determine a distinct chunk size for each chunk size request. In some examples, chunk size request 202 may include a size of second recovery image 120, a quality of a network connection at computing device 102, a utilization percentage of processor 106, or a combination thereof. It should be understood that chunk size request 202 may include any other information that is indicative of a workload on computing device 102.

Using the information in chunk size request 202, firmware instructions 114 may calculate chunk size 204 such that downloading the data chunks may have minimal impact to the performance of computing device 102. For example, instead of setting chunk size 204 to a larger unit (e.g., in megabytes) for a shorter download process, firmware instructions 114 may set chunk size 204 to a smaller unit (e.g., in bytes) when computing device 102 is under a heavy workload and/or the network connection has low bandwidth. When computing device 102 has a light workload and/or the network connection has high bandwidth, firmware instructions 114 may set chunk size 204 to a larger unit.

When chunk size 204 is determined, firmware instructions 114 may transmit chunk size 204 to recovery agent 118. Recovery agent 118 may begin to download second recovery image 120 in data chunks from server 104. Each data chunk may have a size that corresponds to chunk size 204. Recovery agent 118 may transmit first data chunk 124 to firmware instructions 114 when recovery agent 118 receives first data chunk 124 from server 104.

When firmware instructions 114 successfully validate first data chunk 124, firmware instructions 114 may transmit an acknowledgement 206 associated with first data chunk 124 to recovery agent 118. Firmware instructions 114 may store first data chunk 124 in third storage device 112, as described in FIG. 1. Acknowledgement 206 may indicate to recovery agent 118 that firmware instructions 114 have accepted first data chunk 124. In response to receiving acknowledgement 206, recovery agent 118 may download the next data chunk (e.g., second data chunk 126) from server 104, then transmit second data chunk 126 to firmware instructions 114. Firmware instructions 114 may process second data chunk 126 in the same manner as first data chunk 124.

When firmware instructions 114 are not able to successfully validate first data chunk 124, firmware instructions 114 may transmit an error message 208 associated with first data chunk 124 to recovery agent 118. Error message 208 may indicate that firmware instructions 114 have rejected first data chunk 124. In response to receiving error message 208, recovery agent 118 may download first data chunk 124 again from server 104 to repeat the process.

When firmware instructions 114 have received and accepted all the data chunks of second recovery image 120, firmware instructions 114 may transmit a termination message 210 to recovery agent 118 to indicate that the download of second recovery image 120 has finished. In response to receiving termination message 210, recovery agent 118 may terminate the download process with server 104.

Figure 3:
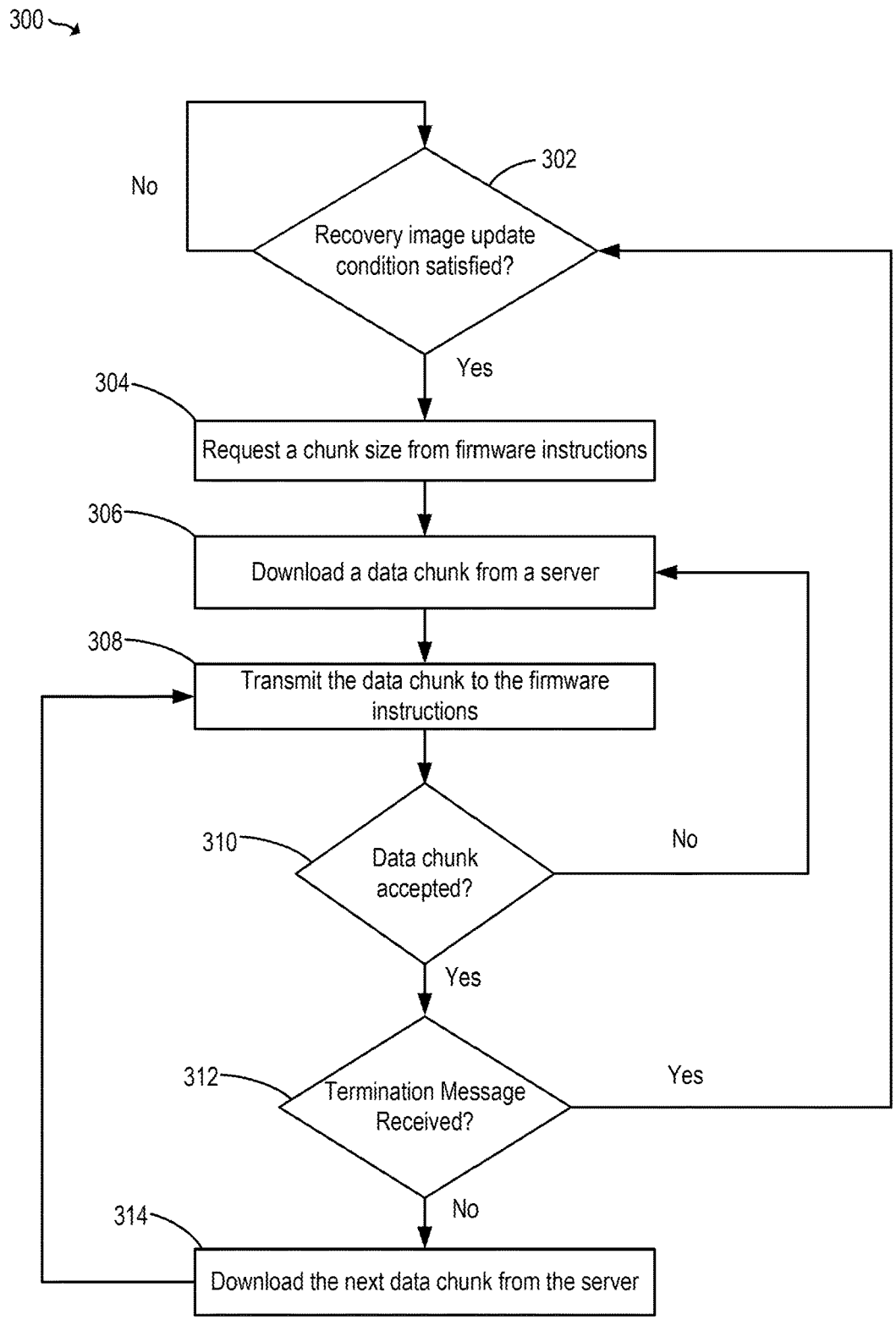
FIG. 3 illustrates a method of operation at a computing device to download a recovery image via data chunks, according to an example.

FIG. 3 illustrates a method 300 of operation at a computing device to download a recovery image via data chunks, according to an example. Method 300 may be implemented by recovery agent 118 of FIGS. 1-2.

At 302, recovery agent 118 may determine if a recovery image update condition has been satisfied. For example, recovery agent 118 may compare first recovery image 122 to second recovery image 120. If first recovery image 122 is older than second recovery image 120, then recovery agent 118 may determine that the recovery image update condition has been satisfied. At 304, in response to a determination that the recovery image update condition has been satisfied, recovery agent 118 may request chunk size 204 from firmware instructions 114. For example, recovery agent 118 may transmit chunk size request 202 to firmware instructions 114 to request chunk size 204.

At 306, recovery agent 118 may download a data chunk from server 104 based on chunk size 204. For example, recovery agent 118 may download first data chunk 124 of second recovery image 120 from server 104. At 308, recovery agent 118 may transmit first data chunk 124 to firmware instructions 114. At 310, recovery agent 118 may determine if first data chunk 124 has been accepted by firmware instructions 114. For example, recovery agent 118 may receive acknowledgement 206 from firmware instructions 114 when first data chunk 124 has been accepted. Recovery agent 118 may receive error message 208 from firmware instructions 114 when first data chunk has been rejected.

When first data chunk 124 has been rejected, recovery agent 118 may download first data chunk 124 from server 104 again. When first data chunk 124 has been accepted, recovery agent 118 may determine if termination message 210 has been received, at 312. Recovery agent 118 may terminate the download process of second recovery image 120 when termination message 210 has been received. When recovery agent 118 has not received termination message 210, recovery agent 118 may download the next data chunk (e.g., second data chunk 126) of second recovery image 120 from server 104, at 314.

Figure 4:
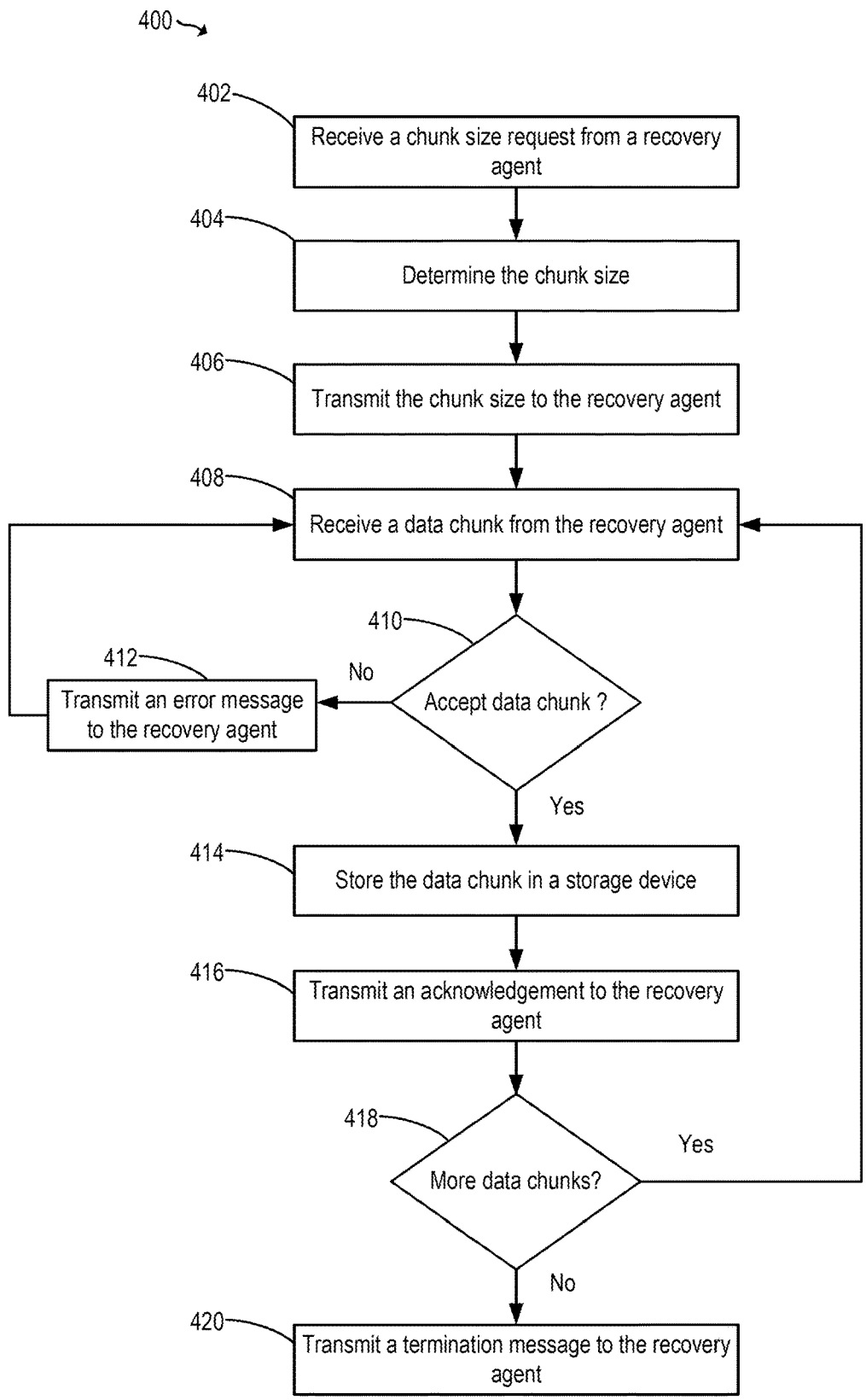
FIG. 4 illustrates a method of operation at a computing device to download a recovery image via data chunks, according to another example.

FIG. 4 illustrates a method 400 of operation at a computing device to download a recovery image via data chunks, according to another example. Method 400 may be implemented by firmware instructions 114 of FIGS. 1-2.

At 402, firmware instructions 114 may receive chunk size request 202 from recovery agent 118. At 404, firmware instructions 114 may determine chunk size 204 based on chunk size request 202. In some examples, chunk size 204 may be fixed and may be stored in third storage device 112. Thus, firmware instructions 114 may retrieve the fixed chunk size 204 in response to receiving chunk size request 202. In some examples, chunk size 204 may be computed based on information in chunk size request 202. Chunk size request 202 may include information that is indicative of workload of computing device 102, firmware instructions 114 may compute chunk size 204 based on the workload.

At 406, firmware instructions 114 may transmit chunk size 204 to recovery agent 118. At 408, firmware instructions 114 may receive a data chunk, such as first data chunk 124, from recovery agent 118. At 410, firmware instructions 114 may validate first data chunk 124 to determine if first data chunk 124 is to be accepted. Firmware instructions 114 may accept first data chunk 124 when first data chunk 124 is successfully validated. For example, firmware instructions 114 may successfully validate first data chunk 124 when a hash value of first data chunk 124 matches an expected hash value. First data chunk 124 may fail the validation when the hash value does not match the expected hash value.

At 412, when firmware instructions 114 reject first data chunk 124, firmware instructions 114 may transmit error message 208 to recovery agent 118 to indicate that first data chunk 124 has been rejected. At 414, when firmware instructions 114 accept first data chunk 124, firmware instructions 114 may store first data chunk 124 in third storage device

112. At 416, firmware instructions 114 may transmit acknowledgement 206 to recovery agent 118 to indicate that first data chunk 124 has been accepted.

At 418, firmware instructions 114 may determine if more data chunks are to come from recovery agent 118. For example, recovery agent 118 may get the size of second recovery image 120 from server 104. Recovery agent 118 may include the size of second recovery image 120 in chunk size request 202. Firmware instructions 114 may compute the number of data chunks based on the size of second recovery image 120. Firmware instructions 114 may count the number of accepted data chunks to determine if more data chunks are to come from recovery agent 118. When more data chunks are expected, firmware instructions 114 may wait for the next data chunk from recovery agent 118.

At 420, when firmware instructions 114 determines that the last data chunk has been accepted, firmware instructions 114 may transmit termination message 210 to recovery agent 118 to indicate all data chunks of second recovery image 120 have been received and accepted. Thus, recovery agent 118 may terminate the download process of second recovery image 120.

Figure 5:
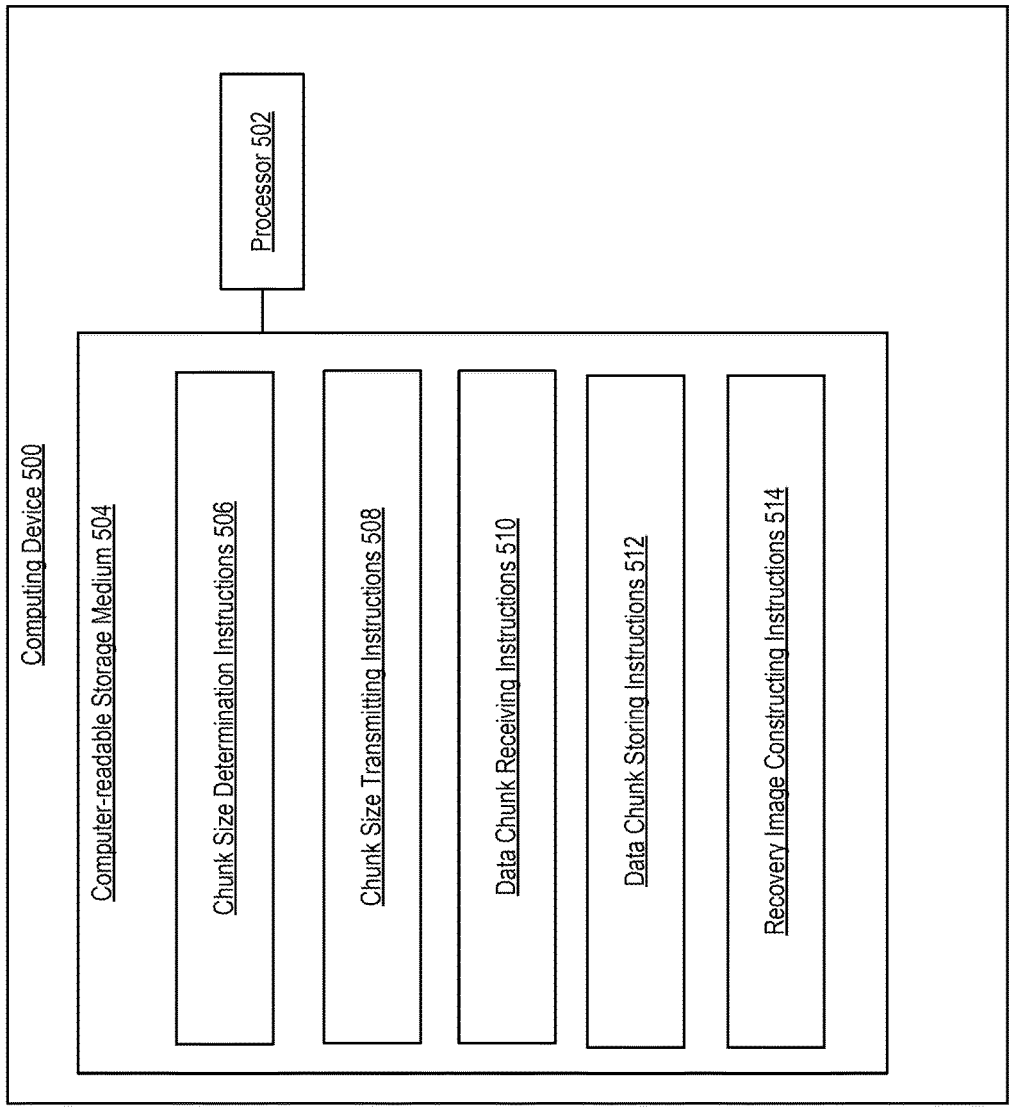
FIG. 5 illustrates a computing device to download a recovery image via data chunks, according to an example.

FIG. 5 illustrates a computing device 500 to download a recovery image via data chunks, according to an example. Computing device 500 may implement computing device 102 of FIG. 1. Computing device 500 may include a processor 502 and a computer-readable storage medium 504.

Processor 502 may be a central processing unit (CPU), a semiconductor-based microprocessor, and/or other hardware devices suitable for retrieval and execution of instructions stored in computer-readable storage medium 504. Processor 502 may fetch, decode, and execute instructions 506, 508, 510, 512, and 514 to download a recovery image from a server, such as server 104. As an alternative or in addition to retrieving and executing instructions, processor 502 may include at least one electronic circuit that includes electronic components for performing the functionality of instructions 506, 508, 510, 512, 514, or a combination thereof.

Computer-readable storage medium 504 may be any electronic, magnetic, optical, or other physical storage device that contains or stores executable instructions. Thus, computer-readable storage medium 504 may be, for example, Random Access Memory (RAM), an Electrically Erasable Programmable Read-Only Memory (EEPROM), a storage device, an optical disc, etc. In some examples, storage medium 504 may be a non-transitory storage medium, where the term "non-transitory" does not encompass transitory propagating signals. Computer-readable storage medium 504 may be encoded with a series of processor executable instructions 506, 508, 510, 512, and 514.

Chunk size determination instructions 506 may determine chunk size 204. For example, referring to FIG. 2, firmware instructions 114 may determine chunk size 204. Chunk size transmitting instructions 508 may transmit the chunk size from firmware instructions 114 to recovery agent 118. For example, referring to FIG. 2, firmware instructions 114 may transmit chunk size 204 to recovery agent 118. Data chunk receiving instructions 510 may receive data chunks from recovery agent 118. For example, referring to FIG. 2, firmware instructions 114 may receive first data chunk 124 from recovery agent 118.

Data chunk storing instructions 512 may store received data chunks in a storage device. For example, referring to FIG. 1, firmware instructions 114 may store first data chunk 124 in third storage device 112. Recovery image constructing instructions 514 may construct a recovery image using data chunks. For example, referring to FIG. 1, firmware instructions 114 may construct second recovery image 120 in third storage device 112 using all the data chunks of second recovery image 120 (e.g., first data chunk 124 and second data chunk 126).

Figure 6:
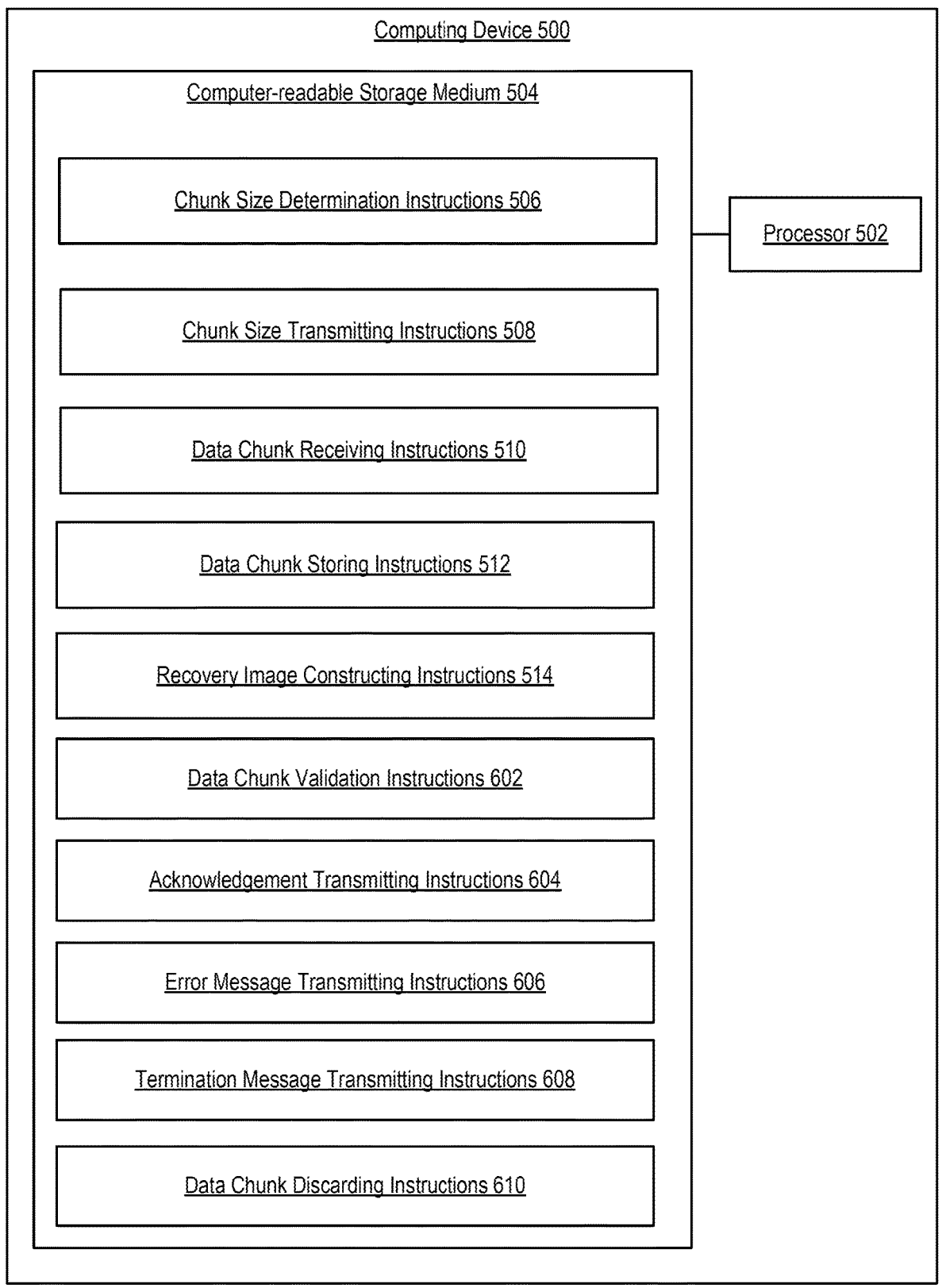
FIG. 6 illustrates a computing device to download a recovery image via data chunks, according to another example.

FIG. 6 illustrates computing device 500 to download a recovery image via data chunks, according to another example. In addition to encoded with instructions 506, 508, 510, 512, and 514, computer-readable storage medium 504 may also be encoded with instructions 602, 604, 606, 608, and 610.

Data chunk validation instructions 602 may validate each received data chunk, such as first data chunk 124 and second data chunk 126. For example, referring to FIG. 1, firmware instructions 114 may validate first data chunk 124. Acknowledgement transmitting instructions 604 may transmit an acknowledgement to recovery agent 118. For example, referring to FIG. 2, when firmware instructions 114 successfully validate first data chunk 124, firmware instructions 114 may transmit acknowledgement 206 to recovery agent 118.

Error message transmitting instructions 606 may transmit an error message to recovery agent 118. For example, referring to FIG. 2, when firmware instructions 114 are not able to successfully validate first data chunk 124, firmware instructions 114 may transmit an error message 208 to recovery agent 118.

Termination message transmitting instructions 608 may transmit termination message 210 to recovery agent 118. For example, referring to FIG. 2, when firmware instructions 114 have received and accepted all the data chunks of second recovery image 120, firmware instructions 114 may transmit termination message 210 to recovery agent 118 to indicate that the download of second recovery image 120 has finished. Data chunk discarding instructions 610 may discard all the data chunks stored in third storage device 112 after second recovery image 120 is constructed in third storage device 112. For example, referring to FIG. 1, when second recovery image 120 is constructed, firmware instructions 114 may discard all the data chunks of second recovery image 120.

Figure 7:
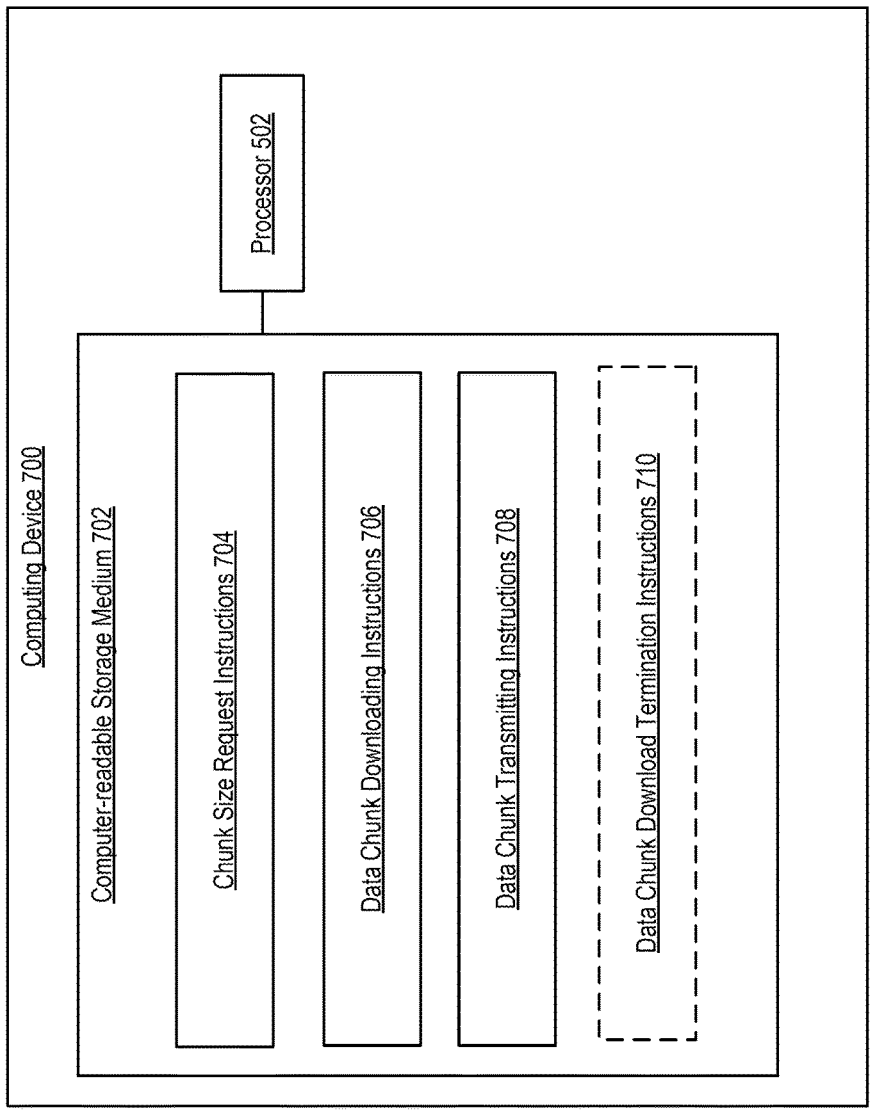
FIG. 7 illustrates a computing device to download a recovery image via data chunks, according to another example.

FIG. 7 illustrates a computing device 700 to download a recovery image via data chunks, according to another example. Computing device 700 may implement computing device 102 of FIG. 1. Computing device 700 may include processor 502 and a computer-readable storage medium 702. Computer-readable storage medium 702 may be similar to computer-readable storage medium 504.

Computer-readable storage medium 702 may be encoded with instructions 704, 706, and 708. In some examples, computer-readable storage medium 702 may also be encoded with instructions 710. Chunk size request instructions 704 may transmit chunk size request 202 to firmware instructions 114. For example, referring to FIG. 2, recovery agent 118 may transmit chunk size request 202 to firmware instructions 114. Data chunk downloading instructions 706 may download data chunks from server 104. For example, referring to FIG. 2, recovery agent 118 may download data chunks 124 and 126 from server 104.

Data chunk transmitting instructions 708 may transmit data chunks to firmware instructions 114. For example, referring to FIG. 1, recovery agent 118 may transmit data chunks 124 and 126 to firmware instructions 114. Data chunk download termination instructions 710 may terminate a download process of a recovery image, such as second recovery image 120. For example, referring to FIG. 2, in response to receiving termination message 210, recovery agent 118 may terminate the download process with server 104.

The use of "comprising", "including" or "having" are synonymous and variations thereof herein are meant to be inclusive or open-ended and do not exclude additional unrecited elements or method steps.

What is claimed is:

1. A non-transitory computer-readable storage medium comprising instructions that when executed cause a processor of a computing device to:
   in response to receiving a chunk size request from a recovery agent executable at an operating system of the computing device, determine a chunk size via firmware instructions of the computing device;
   transmit the chunk size from the firmware instructions to the recovery agent;
   receive data chunks of a recovery image from the recovery agent in sequence;
   store the data chunks in a storage device of the computing device; and
   construct the recovery image using the data chunks.

2. The non-transitory computer-readable storage medium of claim 1, wherein the instructions when executed further cause the processor to:
   in response to receiving a first data chunk from the recovery agent, validate the first data chunk;
   in response to a determination that the first data chunk is valid, transmit an acknowledgement to the recovery agent; and
   in response to a determination that the first data chunk is invalid, transmit an error message to the recovery agent.

3. The non-transitory computer-readable storage medium of claim 1, wherein the instructions when executed further cause the processor to:
   in response to a determination that all data chunks of the recovery image have been stored in the storage device, transmit a termination message to the recovery agent.

4. The non-transitory computer-readable storage medium of claim 1, wherein the instructions when executed further cause the processor to:
   during a recovery operation, validate the data chunks; and
   in response to a determination that all the data chunks are valid, construct the recovery image using the data chunks.

5. The non-transitory computer-readable storage medium of claim 4, wherein the instructions when executed further cause the processor to:
   after constructing the recovery image, discard all the data chunks; and
   store the recovery image in the storage device.

6. The non-transitory computer-readable storage medium of claim 1, wherein the instructions when executed further cause the processor to:
   determine the chunk size, via the firmware instructions, based on a quality of a network connection.

7. The non-transitory computer-readable storage medium of claim 1, wherein the instructions when executed further cause the processor to:
   determine the chunk size, via the firmware instructions, based on a utilization percentage of the processor.

8. A non-transitory computer-readable storage medium comprising instructions that when executed cause a processor of a computing device to:
   request, via a recovery agent executable at an operating system of the computing device, a chunk size from firmware instructions of the computing device;
   in response to receiving the chunk size, download, via the recovery agent, a first data chunk of a recovery image from a server, wherein a size of the first data chunk corresponds to the chunk size;
   receive the first data chunk from the server;
   transmit the first data chunk from the recovery agent to the firmware instructions; and
   in response to receiving an acknowledgement associated with the first data chunk from the firmware instructions, download, via the recovery agent, a second data chunk of the recovery image from the server.

9. The non-transitory computer-readable storage medium of claim 8, wherein the instructions when executed further cause the processor to:
   in response to receiving an error message associated with the first data chunk, download the first data chunk from the server again.

10. The non-transitory computer-readable storage medium of claim 8, wherein the instructions when executed further cause the processor to:
    in response to receiving a termination message from the firmware instructions, terminate downloading data chunks of the recovery image from the server.

11. The non-transitory computer-readable storage medium of claim 8, wherein the instructions when executed further cause the processor to:
    compare a first recovery image in a storage device of the computing device to a second recovery image in the server, and
    in response to a determination that the first recovery image is older than the second recovery image, request the chunk size from the firmware instructions.

12. A computing device comprising:
    a first storage device;
    firmware instructions stored in the first storage device;
    a second storage device;
    a recovery agent and an operating system (OS), wherein the recovery agent and the OS are stored in the second storage device;
    a third storage device; and
    a processor to:
       determine, via the firmware instructions, a chunk size of a recovery image;
       download, via the recovery agent, a first data chunk of the recovery image from a server, wherein a size of the first data chunk corresponds to the chunk size;
       in response to a determination that the first data chunk is valid, download, via the recovery agent, a second data chunk of the recovery image from the server, wherein a size of the second data chunk corresponds to the chunk size;
       store, via the firmware instructions, the first data chunk and the second data chunk in the third storage device; and
       construct, via the firmware instructions, the recovery image using the first data chunk and the data second chunk.

13. The computing device of claim 12, wherein the first storage device, the second storage device, and the third storage device are non-volatile memory.

14. The computing device of claim 12, wherein the processor is to store the recovery image in the third storage device.

15. The computing device of claim 12, wherein the processor is to determine the chunk size based on a utilization percentage of the processor, a quality of a network connection, a size of the recovery image, or a combination thereof.

\* \* \* \* \*